United States Patent [19]

Prosen

[11] 4,452,385
[45] Jun. 5, 1984

[54] CARRIER FOR SUPPORTING PARAPHERNALIA

[75] Inventor: Gildo G. Prosen, Chicago, Ill.

[73] Assignee: CMI Models & Development Corp., Skokie, Ill.

[21] Appl. No.: 389,717

[22] Filed: Jun. 18, 1982

[51] Int. Cl.³ ............................................. B60R 9/10
[52] U.S. Cl. ............................ 224/321; 224/42.03 B; 224/329
[58] Field of Search ................. 224/321, 917, 42.03 B, 224/309, 314, 329; 211/17; 16/329

[56] References Cited

U.S. PATENT DOCUMENTS

| | | | |
|---|---|---|---|
| 1,489,679 | 4/1924 | Thornton | 16/329 |
| 2,068,960 | 1/1937 | Northrup et al. | 224/314 |
| 3,710,999 | 1/1973 | Allen | 224/321 X |
| 3,927,811 | 12/1975 | Nussbaum | 224/42.03 B |
| 4,061,257 | 12/1977 | St. Clair | 224/42.08 |
| 4,085,874 | 4/1978 | Graber | 224/321 |
| 4,182,467 | 1/1980 | Graber | 224/309 |
| 4,290,540 | 9/1981 | Allen | 224/321 X |
| 4,332,337 | 7/1982 | Kosecoff | 224/321 X |
| 4,394,948 | 7/1983 | Graber | 224/314 |

FOREIGN PATENT DOCUMENTS 307227 7/1955 France ................................ 224/321

Primary Examiner—Allan N. Shoap
Assistant Examiner—Robert Petrik
Attorney, Agent, or Firm—John J. Kowalik

[57] ABSTRACT

A carrier for paraphernalia from a motor vehicle comprising a pair of interconnected vertical side frames of inverted V-shape each terminating at its upper end in an apical structure which is provided with an adjusting connection for supporting a vertically tiltable hanger assembly or elongated carrier frame, each side frame having unequal length legs so that it may be mounted on one side with the shorter legs seated on the generally horizontal panels of the vehicle, such as a trunk lid, and at its other side against a vertical lid portion, the hanger assembly having a cross-bar extending through the adjusting connections, and quick-release straps are looped about the cross-bar, the straps being provided with hooks which may be engaged with appropriate portions of the vehicle such as the front and rear edges of the trunk lid. The carrier is so constructed as to be mountable on the roof, sides, trunk lid or hood of the vehicle without bolting.

2 Claims, 12 Drawing Figures

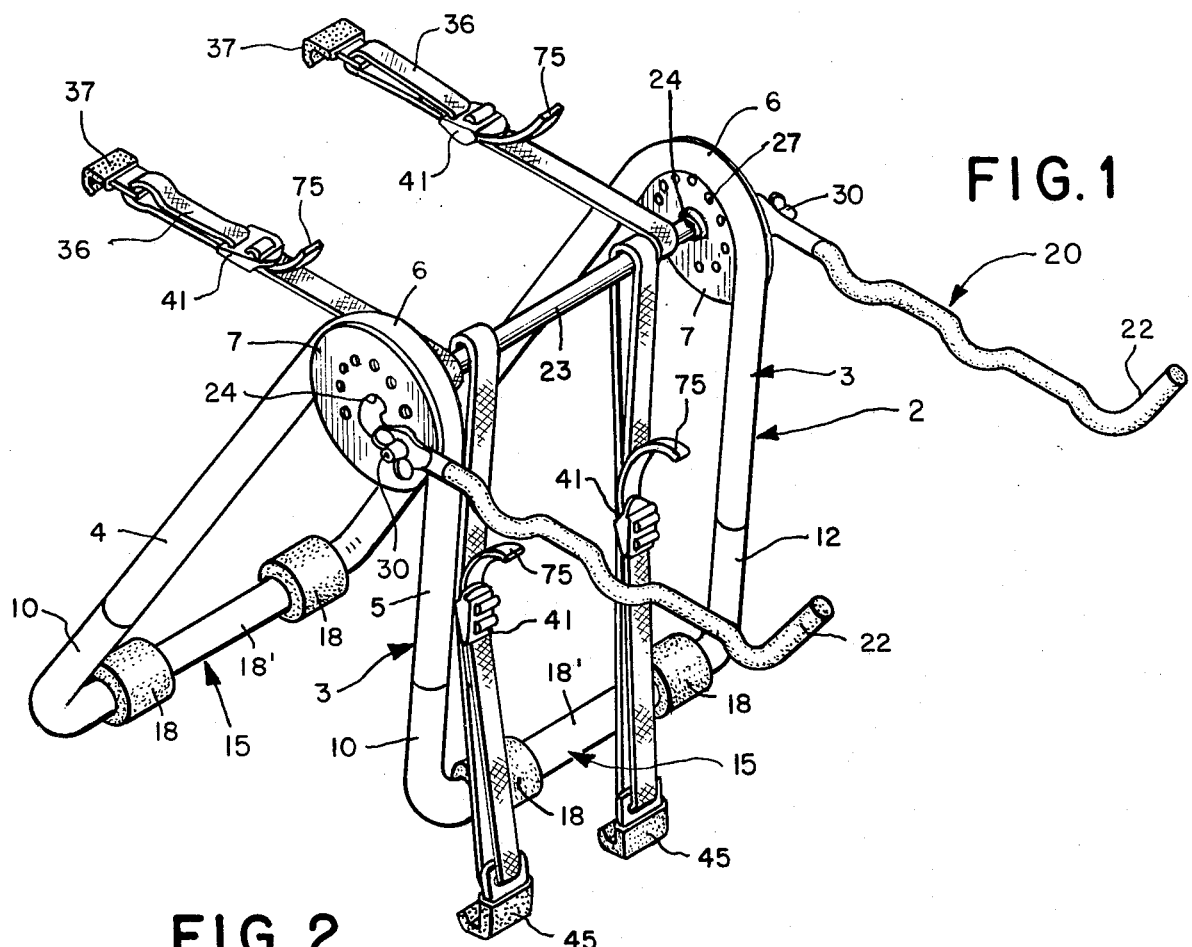
FIG. 1
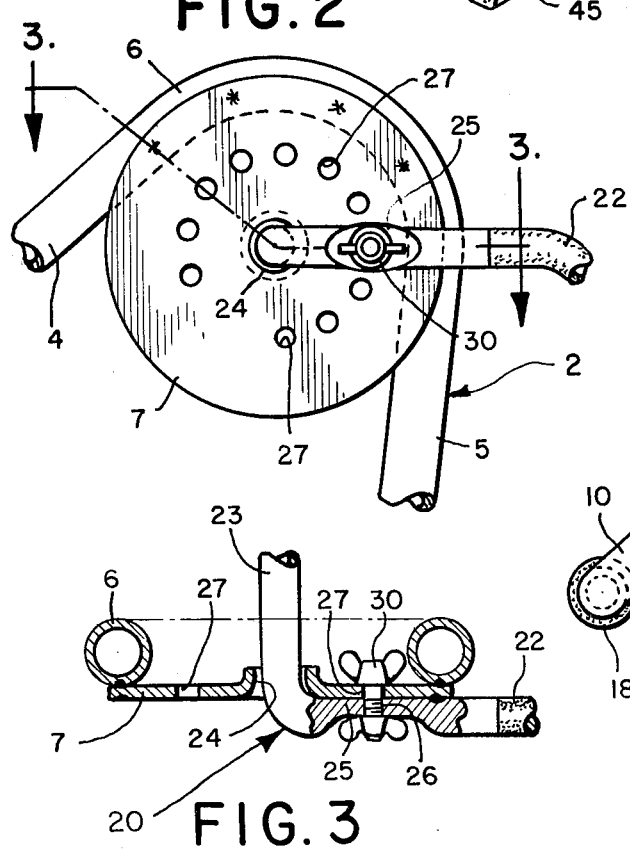
FIG. 2
FIG. 3
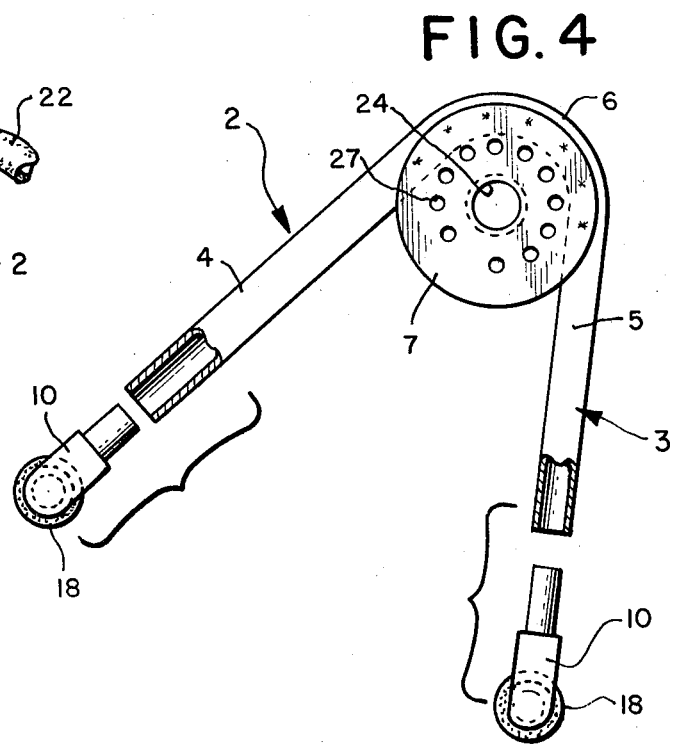
FIG. 4

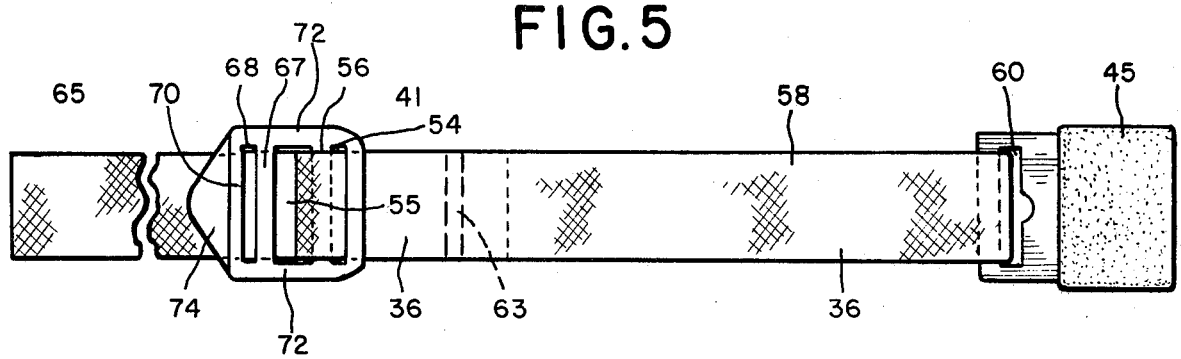
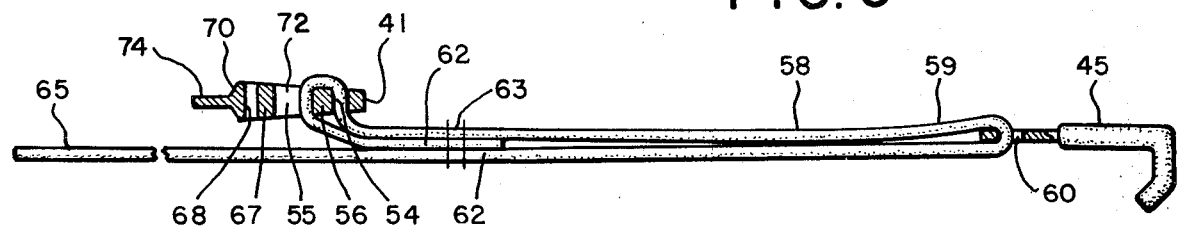
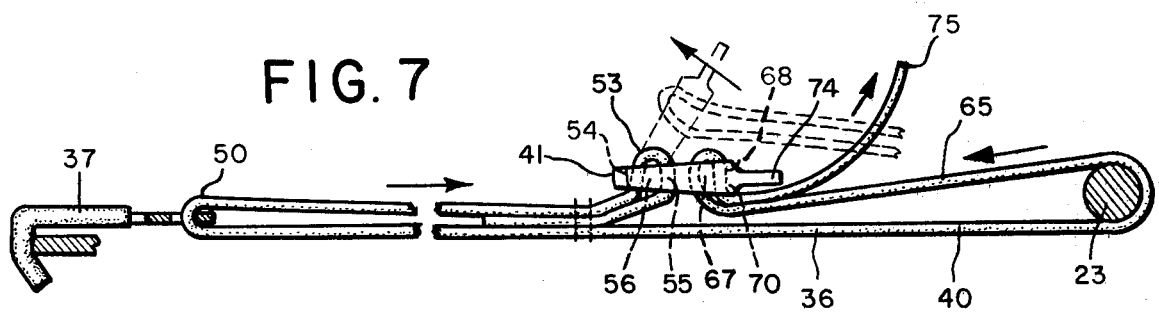
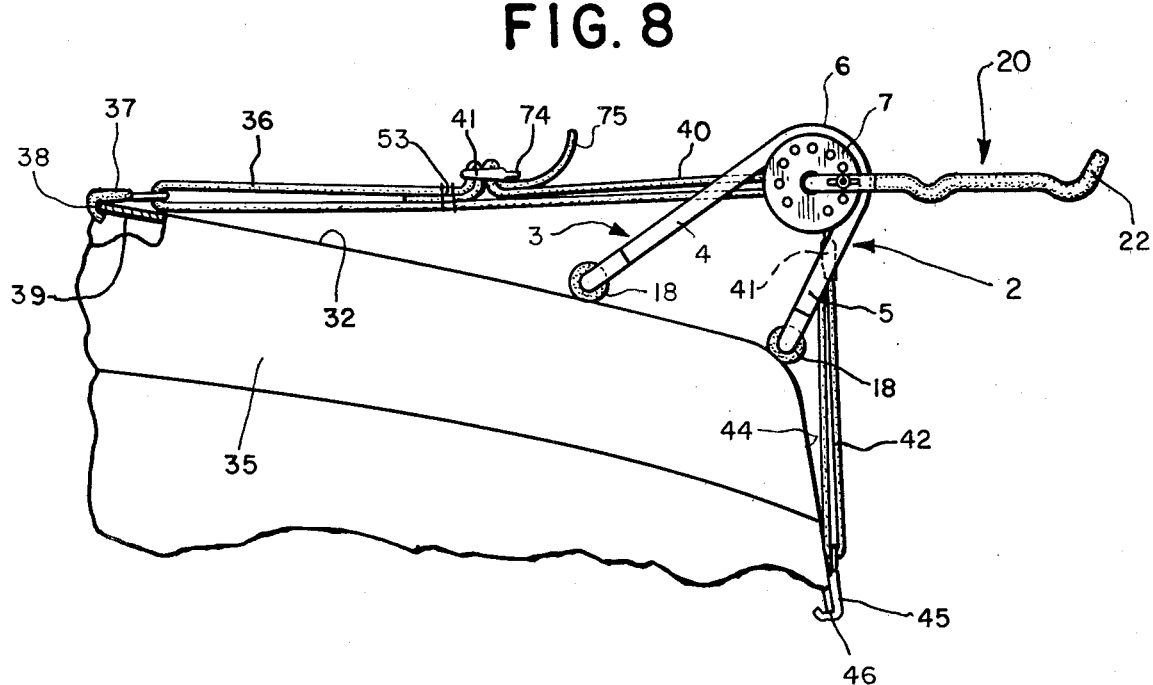

CARRIER FOR SUPPORTING PARAPHERNALIA

BACKGROUND OF THE INVENTION

This invention relates to mounting structures for parphernalia such as bicycles, skis, surf boards and baggage from vehicles.

In recent years is has become popular to transport such articles to vacation areas and the like. Various types of mountings are available at high cost and commonly involve drilling holes in the vehicle for permanent installation. Many of these installations are so placed that they are normally interfere with access to the trunk of an automobile, and many are limited to application to specific vehicles. Many also serve a single purpose.

SUMMARY OF THE INVENTION

A principal object of the invention is to provide a novel, portable mounting or carrier which can be readily assembled and disassembled and which will mount practically on any make of vehicle including vans and campers in addition to various automobiles.

The invention comprehends the provision of a novel stand-off dipode, the legs of which converge outwardly into an apical connecting structuresupporting in one embodiment an adjustable hanger assembly over which bicycles may be hooked, the legs of the dipode being arranged to bear against different body configurations of the hood or trunk lid of a car and in another embodiment the dipode mounting a frame which may be assembled in different positions to carry skis or a surf board and the like.

The invention provides a novel adjustable connection between the hanger and the dipode or pod for positioning hooks provided on the hanger at proper elevation with repect to the ground for hanging such items as bicycles high enough to clear the ground.

A further object is to provide a novel carrier which is particularly adapted to seat at the break of the contour of the trunk lid of a car, one leg of the carrier being relatively shorter than the other and adapted to seat on top of the relatively horizontal portion of the lid and the longer leg being adapted to seat against the generally vertical rear portion of the lid, the carrier being secured by hooks on quick-release straps to the front and rear edges of the lid so that the carrier is easily dismountable for placement in the trunk of the car.

The invention contemplates several embodiments of which the dipode has a pair of inverted V-shaped side frames, each side frame comprising a pair of legs, the legs at one end of the frames being connected to each other by a cross-member and the legs at the other end of the frames also being connected by a cross-member and the cross-members being provided with elastomeric sleeves which serve as cushion pads to prevent marring of the painted surfaces of the vehicles upon which the carrier is mounted, the sleeves also providing a high coefficient of friction to prevent the carrier from slipping from its placemant.

These and other objects and advantages inherent in and encompassed by the invention will become more apparent from the specification and the drawings, wherein:

FIG. 1 is a perspective view of one form of the invention;

FIG. 2 is an enlarged fragmentary side elevational view thereof;

FIG. 3 is a cross-sectional view taken substantially on line 3—3 of FIG. 2;

FIG. 4 is an exploded side elevational view of one side frame partly in section;

FIG. 5 is a top plan view of one of the straps;

FIG. 6 is an edge view of the strap;

FIG. 7 is an edge view of the strap shown in association with parts to which it is connected and illustrating the quick-release feature;

FIG. 8 is a fragmentary side elevational view of a car trunk lid and carrier mounted thereon

EMBODIMENT OF FIGS. 1-8

Figure 9:
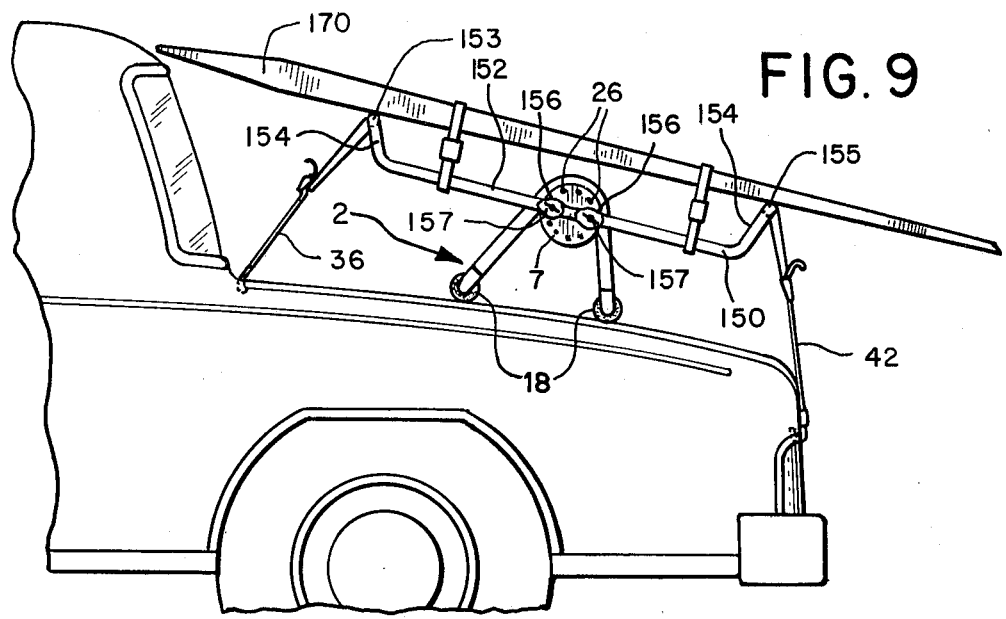
FIG. 9 is a side elevational view of the invention mounted on a trunk lid with a surf-board carrier embodiment attached thereto.

Referring to the drawings, there is shown a dipode or carrier generally designated 2 comprising a pair of side frames 3, 3 each of which is of inverted V-shape having a pair of tubular legs 4 and 5 converging upwardly into an arcuate apical connection 6 encompassing an adjusting plate or mount 7 which is weld-connected thereto.

The lower ends of legs 4 and 5 telescope into upstanding legs 10, and 12 of tubular U-shaped identical front and rear connectors as base members 15 each of which has a cross-bar or bight portion 18' interconnecting the respective legs 10,12. Rear legs 4 of the side frames telescope into the legs 10,12 of the rear base and the front legs 10,12 telescope into the legs 10,12 of the front base member 15.

A pair of tubular sleeves or pads 18,18 made of rubber or other elastomeric material are expanded and sleeved over the cross-bars 18' and suitable spaced to provide a stable support.

Prior to assembly of the side frames with the base members, a hanger or paraphernalia support 20 generally U-shaped in plan, is assembled with the adjusting plates 7. The hanger has a pair of laterally spaced hooks or arms 22,22, which may be vinyl coated, and a cross-bar 23 interconnecting the arms at their inner ends in right angle corners. The hanger is assembled by threading one arm 22 through the aperture 24 in one adjusting plate from its outer side past the adjacent corner until the cross-bar 23 enters the aperture. Then the same arm 22 is thereaded from the inside of the other adjusting plate through its center aperture until the cross-bar 23 enters it. Then the base members are assembled as heretofore stated with the legs of the side members. Each arm 22 has adjacent to its inner end a flattened area 25 with a horizontal opening 26 which is alignable with any one of a series of openings 27 in the adjacent adjusting plate. A wing bolt and nut assembly 30 is passed through selected aligned openings in the arm and plate which are secured by tightening the wing nut. It will be noted that the openings 27 in the plate are located on a common radius from the cross-bar opening or aperture 24 and that the position of the hanger is dependent upon the slope of the top surface 32 of the trunk lid 35 of the automobile. The arms are raised on appropriate height to hang the bicycle clear of the ground and secured in adjusted position.

As best seen in FIG. 8 the carrier is seated on the pads 18 atop the surface 32 with the longer legs to the rear to compensate for the usual slope of the lid. A pair of laterally spaced straps 36 are connected to the crossbar 23. The straps 36 are provided with hooks 37 at one end which hook over the forward edge 38 of the car lid 39. Each strap has a loop 40 about the crossbar 23 and is threaded through a buckle 41 which is secured to an intermediate portion of the strap 36. Similar straps 42,42 extend downwardly behind the vertical portion 44 of the lid and have hooks 45 at their lower ends grasping the lower rear edge 46 of the trunk lid 39. Each strap is tightened and under tension drawing the carrier firmly against the lid or other portion of a vehicle wherever the carrier is positioned, such as the roof of a van, or the hood of a car wherein the bicycles are front mounted or even on the rear wall of a van.

As best seen in FIGS. 5-7 each strap is a single piece of webbing. A loop 50 is formed at one end extending through an eye in hook 37 and is sewn at 52. The strap is folded into three plies intermediate its ends to form a loop 53 which extends through a pair of parallel slots 54,55 about an intervening bar 56 in one end of a buckle 57. The upper ply 58 continues to the other end of the strap and is formed into a loop 59 which extends through eye 60 in hook 45 and the free end 62 of the loop is sewn at 63 to the top ply 58.

It will be observed that the free end 65 of the strap is looped about the crossbar 23 and then is threaded through slot 54 and extended forwardly over bar 67 of the buckle and through a forward slot 68 formed between the head or end bar 70 of the buckle and the side members 72,72 of the buckle. A forwardly projecting lever tongue 74 extends from the buckle head bar 70 for engagement by the underposed strap end 75 which is adapted to lift the buckle and release the belt from its wedged position and engagement with the buckle head attendant to the belt end being lifted whereby the belt may be quickly loosened and the hooks unhooked.

EMBODIMENT OF FIGS. 9-11

Figure 10:
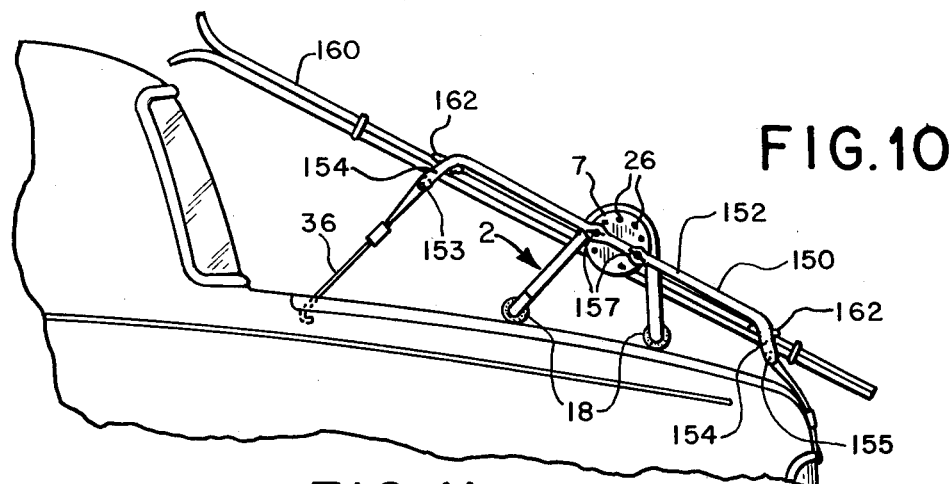
FIG. 10 shows the structure of FIG. 9 with the parts assembled to support skis.
Figure 11:
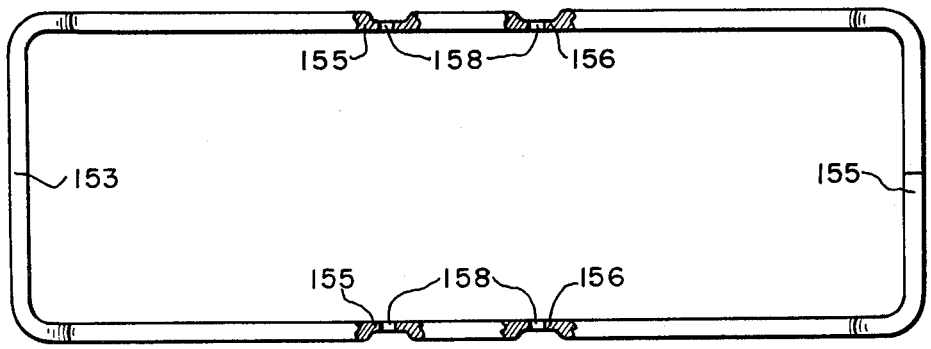
FIG. 11 is a top plan view of the ski and surf-board supporting frame.
Figure 12:
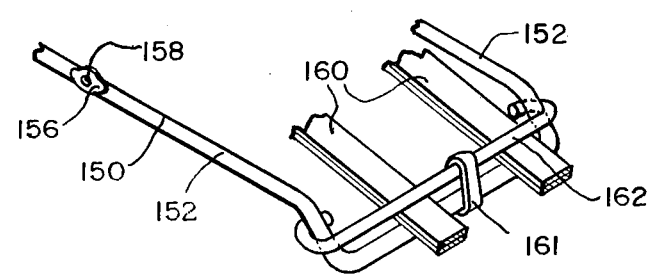
FIG. 12 is a perspective end view of FIG. 11 taken from the rear thereof.

In this embodiment as in all others like parts are identified with the same reference numerals. The dipode carrier 2 is shown mounted on the trunk lid and supports a rectangular frame 150 which has a pair of side rails 152,152 which in FIG. 9 have their end portions 154,154, angled upwardly and connected to crossmembers 153,155. In FIGS. 10 and 11 the frame is inverted and the end portions 154 extend downwardly. An intermediate portion of each side arm 152 is provided with flattened sections 156,156 which lie against the external side of an associated adjusting plate 7. Each section 156 has an aperture 158 alignable with diametrically opposite apertures 26 in the related adjusting plate 7. A pair of wing nut bolt assemblies 157 extend through respective openings 158 and appropriate openings 26 to secure the frame 150 to the carrier in any of a series of adjusted positions as desired. The cross-members 153, 155 are respectively secured by straps 36 to the front edge of the trunk lid and by straps 42 to the rear edge of the trunk lid.

Skis 160 or luggage etc. may be positioned on the frame 150 and secured thereto by straps and the like. A surf board 170 is shown secured in FIG. 9. In FIGS. 10 and 11 the frame 150 is inverted and the skis 160 rest upon the cross-members 153,155 and are tied thereto either by straps of padlocks 161,161. A locking bar 162 may be positioned above the skis over each member 153, 155. Each bar 162 has hook ends which hook about the side rails 152 to prevent removal without unlocking the padlocks 161 which extend about the bars 162 153 and 162,155.

Several embodiments of the invention have been disclosed to illustrate the best modes of the invention without intending to limit the scope thereof as set forth in the appended claims.

What is claimed is:

1. An automobile bicycle carrier comprising a pair of generally V-shaped side frames disposed in relatively parallel planes, said side frames each being of one-piece tubular stock and having two straight leg portions converging toward and connected to the ends of an apical portion, a pair of tubular U-shaped base members extending between corresponding legs of said side frames and having tubular end portions telescoped therewith and interconnecting the side frames into a rigid structure, mounting means fastened on each apical portion and having a center aperture perpendicular to the planes of the side frames and having an arcuate series of openings concentric about the center opening, and a paraphernalia carrying means having a pair of side elements positioned against the external sides of the respective side frames, and releasable connectors extending through alignable openings in said elements and respective mounting means for securing the carrying means to the side frames, and strap means for attaching the carrier to a vehicle with the base members engaging the vehicle.

2. The invention according to claim 1 and said paraphernalia carrying means comprising a generally rectangular frame having end members connected to said side elements.

* * * * *